(12) United States Patent
Nevins et al.

(10) Patent No.: US 12,474,120 B2
(45) Date of Patent: Nov. 18, 2025

(54) INDUCED DRAFT HEAT REJECTION EQUIPMENT WITH TOP MOUNTED BACKWARD-CURVED CENTRIFUGAL FANS

(71) Applicant: Evapco, Inc., Taneytown, MD (US)

(72) Inventors: Scott Nevins, Taneytown, MD (US); Rob Vandenboer, Taneytown, MD (US); Jeffrey Luke Herwig, Taneytown, MD (US)

(73) Assignee: Evapco, Inc., Taneytown, MD (US)

( * ) Notice: Subject to any disclaimer, the term of this patent is extended or adjusted under 35 U.S.C. 154(b) by 113 days.

(21) Appl. No.: 17/887,876

(22) Filed: Aug. 15, 2022

(65) Prior Publication Data

US 2023/0047198 A1 Feb. 16, 2023

Related U.S. Application Data

(60) Provisional application No. 63/291,084, filed on Dec. 17, 2021, provisional application No. 63/232,975, filed on Aug. 13, 2021.

(51) Int. Cl.
*F28C 1/14* (2006.01)
*F28C 1/04* (2006.01)
*F28C 1/00* (2006.01)

(52) U.S. Cl.
CPC ............... *F28C 1/14* (2013.01); *F28C 1/04* (2013.01); *F28C 2001/006* (2013.01)

(58) Field of Classification Search
CPC .... F25D 13/06; F28C 1/04; F28C 1/14; F28C 2001/006
See application file for complete search history.

(56) References Cited

U.S. PATENT DOCUMENTS

| 4,917,572 | A | 4/1990 | Van Houten |
| 2008/0083231 | A1 | 4/2008 | Wang |
| 2018/0128505 | A1* | 5/2018 | Baetens ............... F24F 1/26 |
| 2020/0158438 | A1 | 5/2020 | Nevins et al. |

FOREIGN PATENT DOCUMENTS

| AU | 2010354078 | 12/2011 |
| CN | 203 642 346 | 6/2014 |
| CN | 206786853 | 12/2017 |
| CN | 108 168 331 | 6/2018 |
| CN | 208 832 820 | 5/2019 |
| CN | 110 701 923 | 1/2020 |

OTHER PUBLICATIONS

International Search Report Issued in co-pending application No. PCT/US2022/040316, dated Feb. 17, 2023.
European Search Report Issued in EP Application No. 22856704.6, dated Jul. 21, 2023.

* cited by examiner

*Primary Examiner* — Charles S Bushey
(74) *Attorney, Agent, or Firm* — Whiteford, Taylor & Preston, LLP; Peter J. Davis

(57) ABSTRACT

Heat rejection devices, including cooling towers, condensers and closed circuit coolers, having side-mounted backward-curved centrifugal fans mounted on top of the device, above a fan plenum instead of a top-mounted axial fan. Heat rejection capability can be easily modified by adding or subtracting fans without impacting unit footprint. Also, the ability to handle higher static pressures allows for the use of a more densely packed heat exchanger in the same footprint unit, which will increase the unit performance.

12 Claims, 11 Drawing Sheets

INDUCED DRAFT HEAT REJECTION EQUIPMENT WITH TOP MOUNTED BACKWARD-CURVED CENTRIFUGAL FANS

BACKGROUND OF THE INVENTION

Field of the Invention

The present invention relates to heat rejection devices, namely cooling towers, closed circuit coolers and condensers.

Description of the Background

Current cooling towers, closed circuit coolers, and condensers have two basic air driving configurations. Induced draft axial fan configurations (See, e.g., FIG. 1) allow for more even airflow distribution through the heat exchanger—which improves the overall efficiency of the heat rejection equipment—but do not provide the capability to handle higher static pressure applications (indoor installations, ducted applications, plume abatement solutions, sound attenuation solutions, etc.).

Forced draft forward curved centrifugal blower designs (See, e.g., FIG. 2) discharge high velocity air into a large plenum section of the heat rejection equipment beneath the heat exchanger. Internal baffles, turning devices, or other devices are used to redirect the airflow vertically, but localized high velocity zones are still present which negatively impacts efficiency. These devices also add to the static pressure of the system and further contribute to a loss in overall efficiency of the heat rejection equipment.

SUMMARY OF THE INVENTION

The present invention results from the unexpected discovery that replacing the standard axial fan in induced draft heat rejection equipment with a plurality of backward-curved centrifugal fans increases efficiency (as compared to the corresponding forced draft arrangements) and provides the capability to handle higher static pressure applications (indoor installations, ducted applications, plume abatement solutions, sound attenuation solutions, etc.) than axial fan equipment.

The heat rejection equipment (i.e. cooling tower, closed circuit cooler, condenser) is comprised of multiple components including an air inlet, heat transfer media and fans, typically in a pre-fabricated housing unit. In the novel and unobvious design of the invention, a fan section using backward-curved centrifugal fans is installed on top of the heat transfer media and the air inlet, drawing the air through the unit in an induced draft design.

The induced draft configuration using backward-curved centrifugal fans has numerous advantages over forced draft and induced draft axial fan configurations. For example, induced draft configuration allows for layout flexibility. Air inlet height can be increased for installations that have reduced clearances, which mitigates capacity losses that would otherwise be associated with typical forced draft designs with reduced clearances (between air inlet face and wall, adjacent unit, etc.). In addition, induced draft configuration allows the air inlet face to be on 1, 2, 3, or all 4 faces of the unit. Furthermore, induced draft configuration provides easy access to the basin, to facilitate routine tower maintenance. Typical forced draft units by design pressurize the large plenum section beneath the heat exchanger and therefore must have "sealed" basins with access ports through small door openings or similar.

In addition, induced draft configurations allow for more even airflow distribution through the heat exchanger—which improves the overall efficiency of the heat rejection equipment. The even airflow distribution also makes the configuration better suited for plume abatement applications—utilizing a coil heat exchanger placed in series with the wet cooling tower. The heat exchanger sensibly heats the wet discharge air and is placed in the plenum above the drift eliminators or above the fan. The ability of the centrifugal fan to accommodate high levels of static pressure make this an advantage over typical induced draft axial fan plume abatement designs.

Another disadvantage of typical forced draft units is the inherent high inlet velocities and low exit velocities, which makes them more susceptible to recirculation. In the induced draft configuration of the present invention, the air inlet height can be increased to yield a larger inlet area providing lower inlet velocities that will prevent or minimize recirculation impact.

In other advantages to the present invention, heat rejection capability can be readily/easily modified by adding/subtracting fans without impacting unit footprint. Also, the ability to handle higher static pressures allows for the use of a more densely packed heat exchanger (tighter spaced fill media or more aggressive microstructure to increase the surface area per square foot) in the same footprint unit—which will increase the unit performance. Additional layers of fill or coil rows can also be applied without the diminishing return typically seen with axial fans due to static pressure limitations. Similarly, the ability to handle higher static pressures allows for the use of more efficient (e.g., tighter spaced sound baffles or offset baffles) inlet, outlet or inlet & outlet sound reduction options than are possible on typical induced draft axial fan units.

Induced draft configuration would be suitable for counterflow and crossflow cooling towers (evaporative coolers, evaporative condensers, dry coolers, and dry condensers).

BRIEF DESCRIPTION OF THE DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

Figure 1:
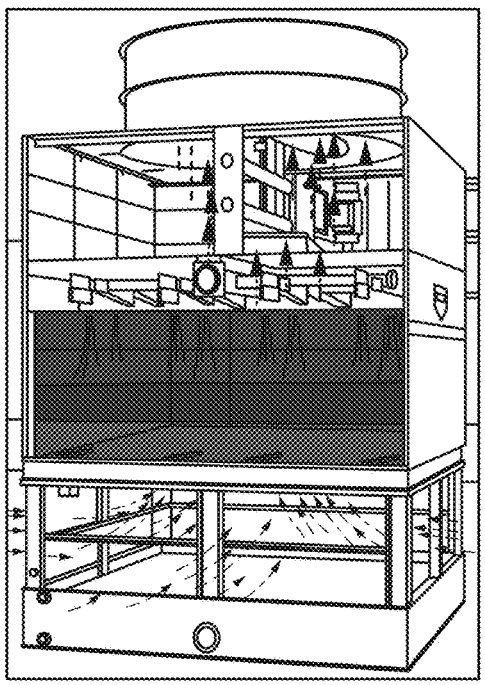
FIG. 1 is a three dimensional cutaway representation of a prior art cooling tower with axial fan on top.
Figure 2:
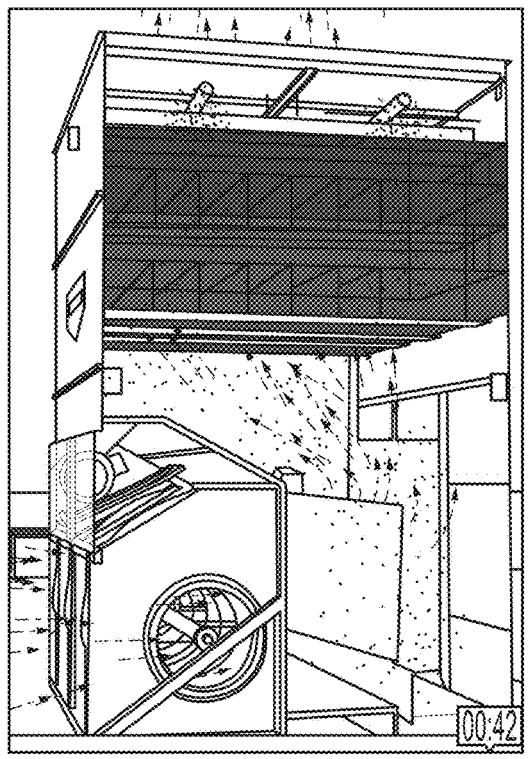
FIG. 2 is a three-dimensional cutaway representation of a prior art cooling tower with centrifugal fans at the bottom.

Features in the attached drawings are numbered with the following reference numerals:

100 cooling tower
102 cooling tower housing
104 hot water intake
106 water distribution system
108 fill
110 air intake plenum
112 water basin
114 cool water outlet
116 fan plenum
120 backward-curved centrifugal fans
122 air intake openings
200 condenser or closed circuit cooler
202 condenser/cooler housing
206 water distribution system
208 coil
210 an air intake plenum
212 water basin
213 water pump
214 return pipe
216 fan plenum
220 backward-curved centrifugal fans
222 air intake openings
300 dry cooler/condenser
302 frame
304 coil bundles
306 finned tubes
308 inlet header
309 inlet header connection
310 outlet header
312 return bend
314 backward-curved centrifugal fans
400 cross flow cooling tower
402 cross flow cooling tower housing
404 hot water intake
406 water distribution system
408 liquid dispersion media
410 central plenum
412 water basin
414 cool water outlet
420 backward-curved centrifugal fans
422 air intake openings

DETAILED DESCRIPTION OF THE INVENTION

Figure 3:
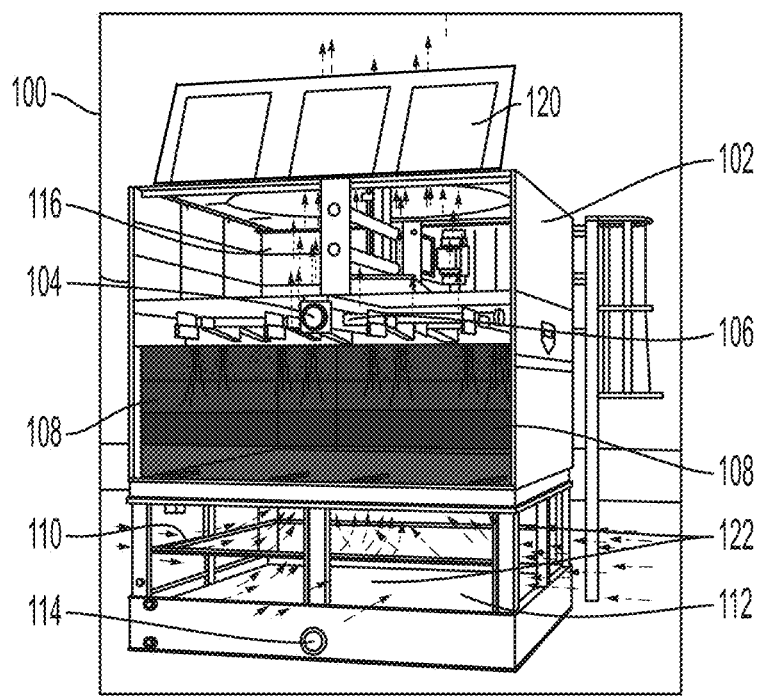
FIG. 3 is a three-dimensional cutaway representation of a cooling tower according to an embodiment of the invention with three side-mounted backward-curved centrifugal fans on top.
Figure 4:
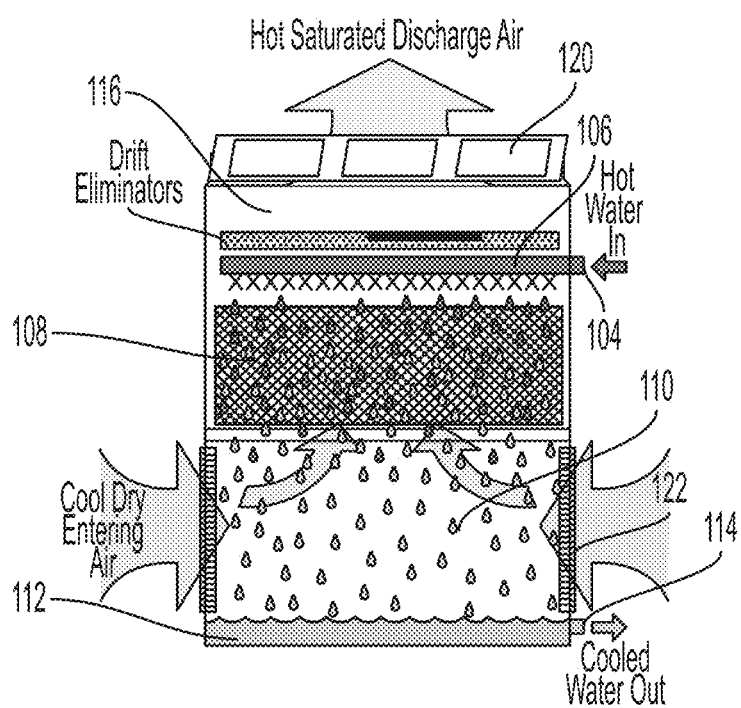
FIG. 4 a two dimensional cross-sectional representation of a cooling tower according to an embodiment of the invention with three side-mounted backward-curved centrifugal fans on top.

According to a first embodiment, represented generally in FIGS. 3 and 4, a cooling tower 100 includes four-sided metal housing 102. Within the housing is a hot water intake 104, a water distribution system 106 connected to the hot water intake 104, the water distribution system 106 including a network of horizontal tubes with spray nozzles attached on their bottom or side to spray the hot water downward over liquid dispersion media or "fill" 108. Beneath the fill 108 is an air intake plenum 110 and at the bottom of the air intake plenum is a water basin 112 where cooled water is collected and returned to a source via cool water outlet 114. Above the water distribution system there is a fan plenum 116, and on the top of the unit, above the fan plenum 116, two or more backward-curved centrifugal fans 120 are arranged which pull air from the outside through openings 122 in the side of the unit adjacent the air intake plenum 110, up through the fill 108 and out the top of the unit. The fans may be AC belt drive or EC direct drive motors. While three backward curved centrifugal fans are shown in FIGS. 3 and 4, only two may be used, or as many or six or more may be used. The air intake plenum 110 may be open on one, two, three or all four sides. Hot water enters the water distribution system 106 via the hot water intake 104 and is sprayed over the fill 108. Air is drawn into the air intake plenum 110, up through the fill 108, past the water distribution system 106, through the fan plenum 116 and out through the backward-curved centrifugal fans 120. Contact between the falling hot water and the rising air cools the water which falls into the basis for recirculation back to the source.

Figure 5:
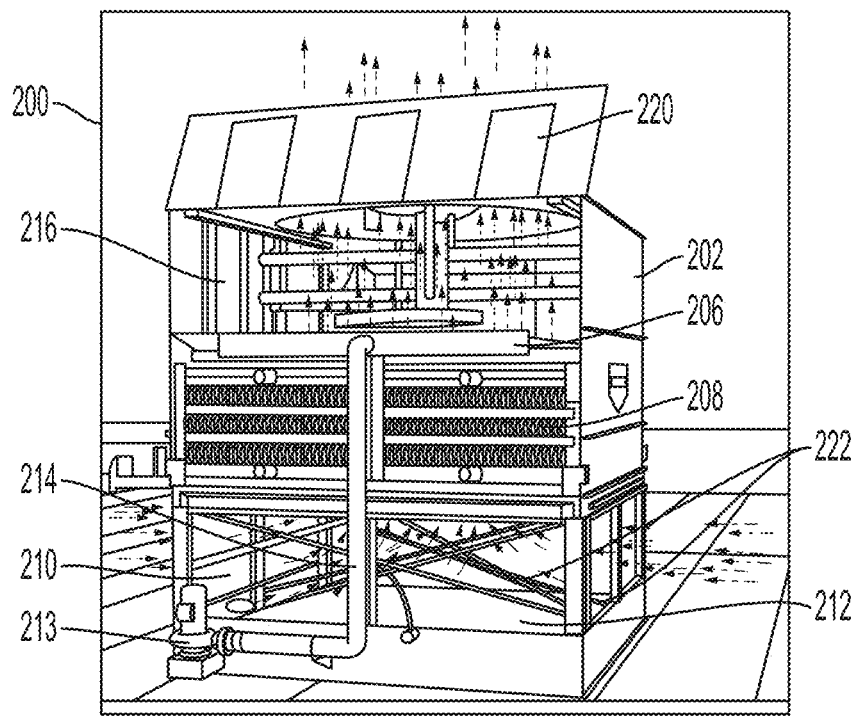
FIG. 5 is a three-dimensional cutaway representation of a closed circuit cooler/condenser according to an embodiment of the invention with three side-mounted backward-curved centrifugal fans on top.
Figure 6:
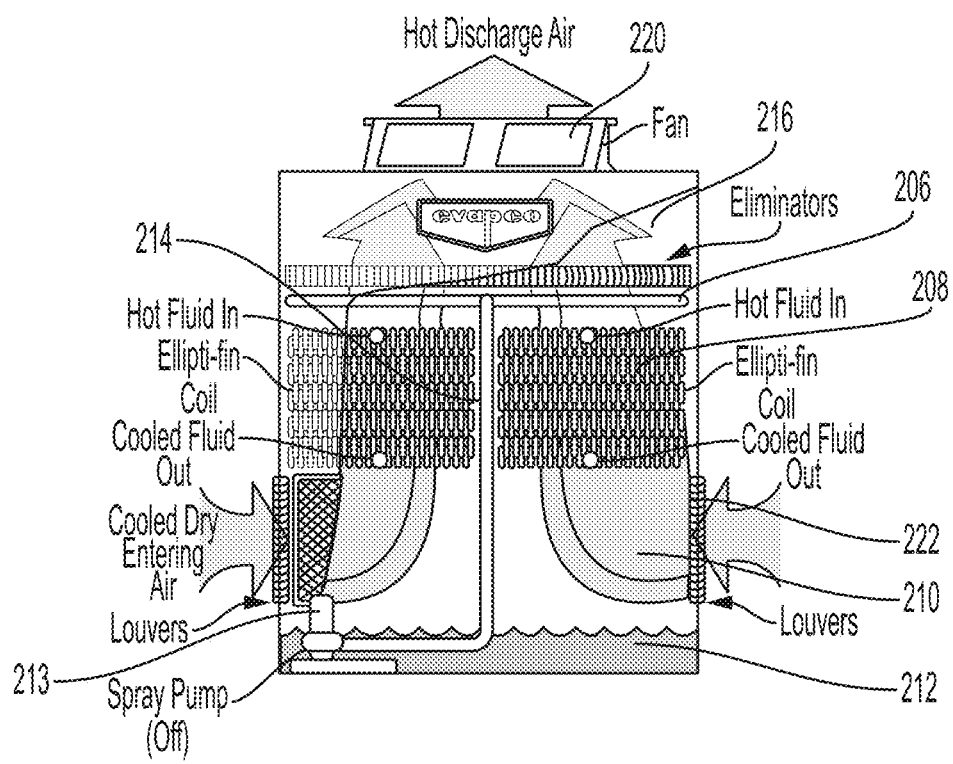
FIG. 6 a two dimensional cross-sectional representation of a closed circuit cooler/condenser according to an embodiment of the invention with two side-mounted backward-curved centrifugal fans on top.
Figure 7:
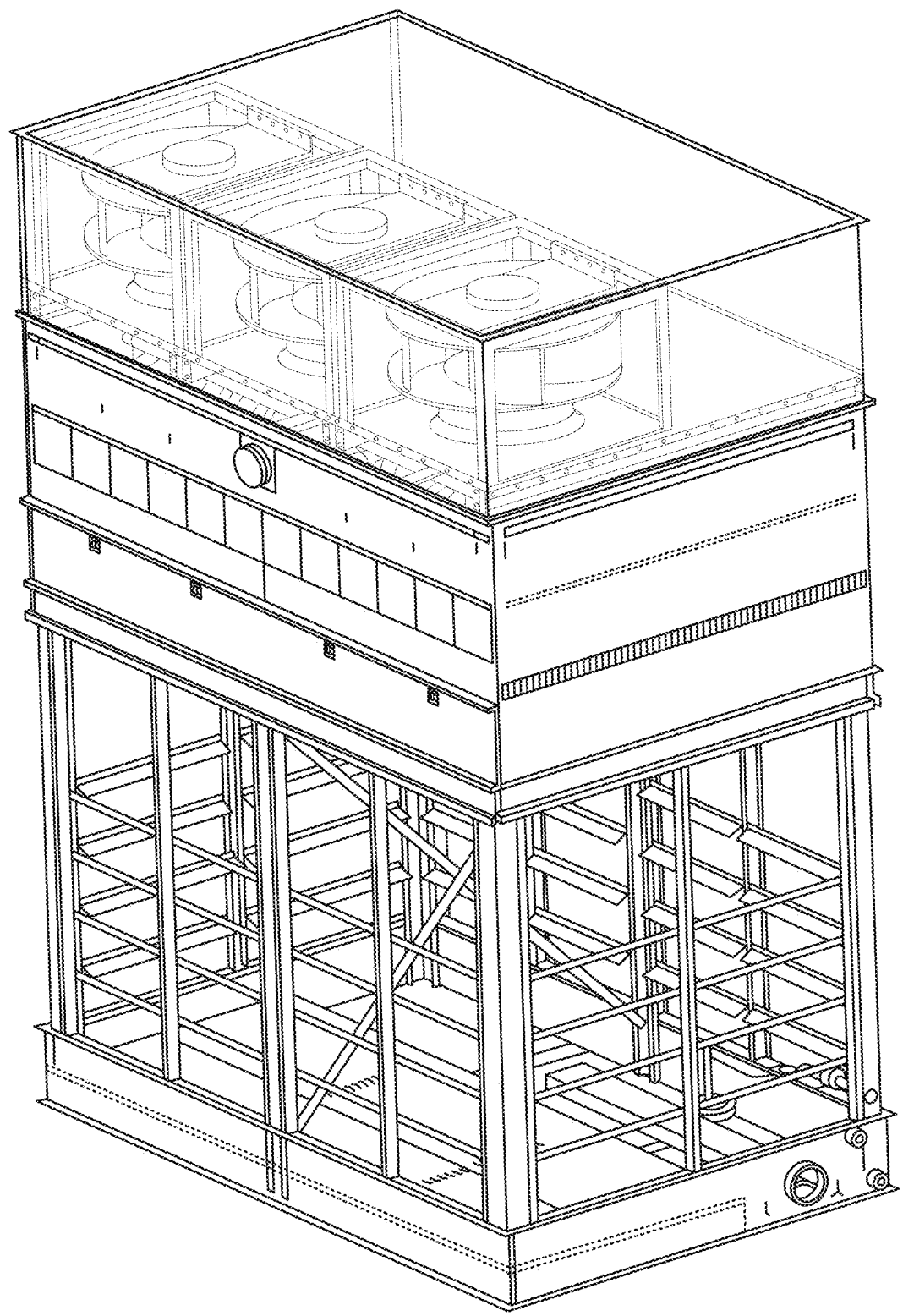
FIG. 7 is a three-dimensional representation of a cooling tower according to an embodiment of the invention with three side-mounted backward-curved centrifugal fans on top, arranged in-line on one side of an air intake plenum in which all sides may be opened or closed for intake.

According to a second embodiment, represented generally in FIGS. 5 and 6, a condenser or closed circuit cooler 200 includes four-sided metal housing 202. Water distribution system 206 is located within the housing above coil 208 which in turn is located above an air intake plenum 210. The air intake plenum optionally contains liquid dispersion media. At the bottom of the air intake plenum 210 is a water basin 212 where water is collected and pumped via water pump 213 to the water distribution system 206 through return pipe 214. Above the water distribution system 206 there is a fan plenum 216, and on the top of the unit above the fan plenum two or more backward-curved centrifugal fans 220 are arranged which pull air from the outside through openings 222 in the side of the unit adjacent the air intake plenum 210, up through the coil 208 and out the top of the unit. The fans may be AC belt drive or EC direct drive motors. While three backward curved centrifugal fans are shown in FIG. 5 and two are shown in FIG. 6, as many or six or more may be used. The air intake plenum may be open on one, two, three or all four sides. Process fluid is circulated through the coil 208 and is cooled by evaporative effect of the water and air passing over the coil. In cooler weather, the water distribution/recirculation system can be turned off and the unit can be operated in dry mode.

In a hybrid embodiment, the condenser/cooler may have a separate dry heat exchange section including a second process fluid coil located below the fan plenum and above the water distribution system. According to this embodiment, process fluid flows through the dry heat exchange section before passing to coil 208 beneath the water distribution system.

Figure 8:
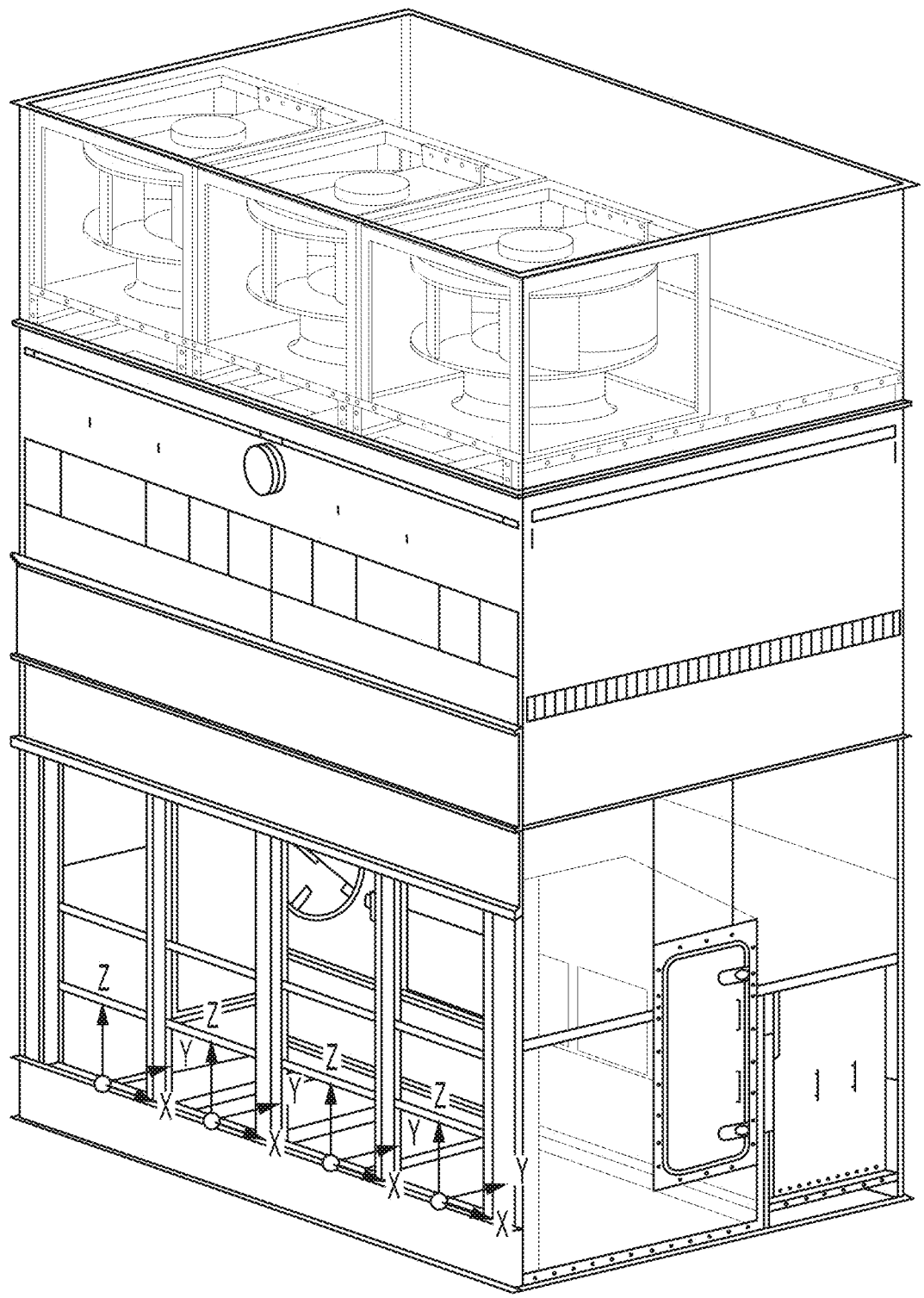
FIG. 8 is a three-dimensional representation of a cooling tower according to an embodiment of the invention with three side-mounted backward-curved centrifugal fans on top, arranged in-line on a single air intake side of an air intake plenum.
Figure 9:
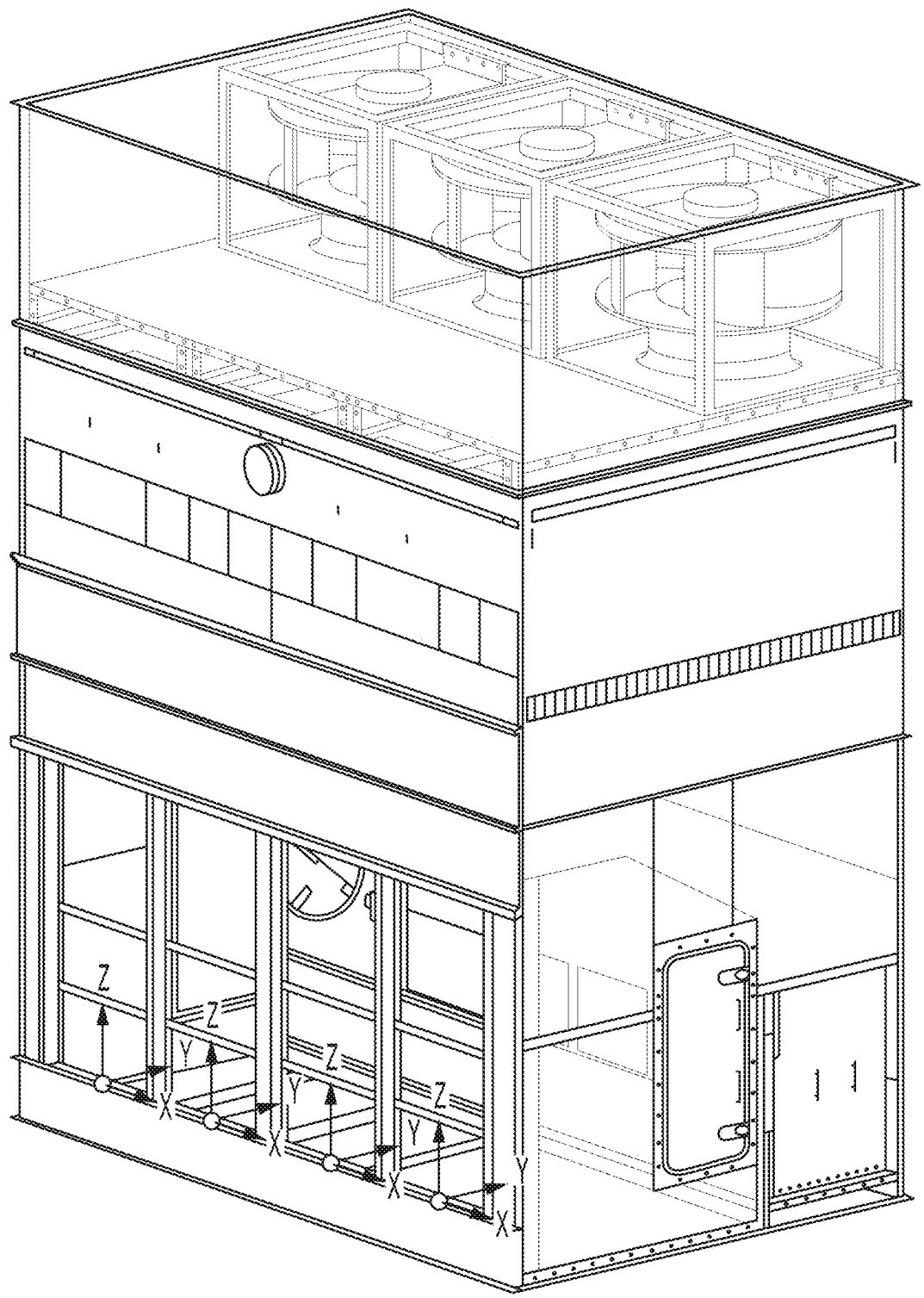
FIG. 9 is a three-dimensional representation of a cooling tower according to an embodiment of the invention with three side-mounted backward-curved centrifugal fans on top, arranged in-line on a side opposite the single air intake side of an air intake plenum
Figure 10:
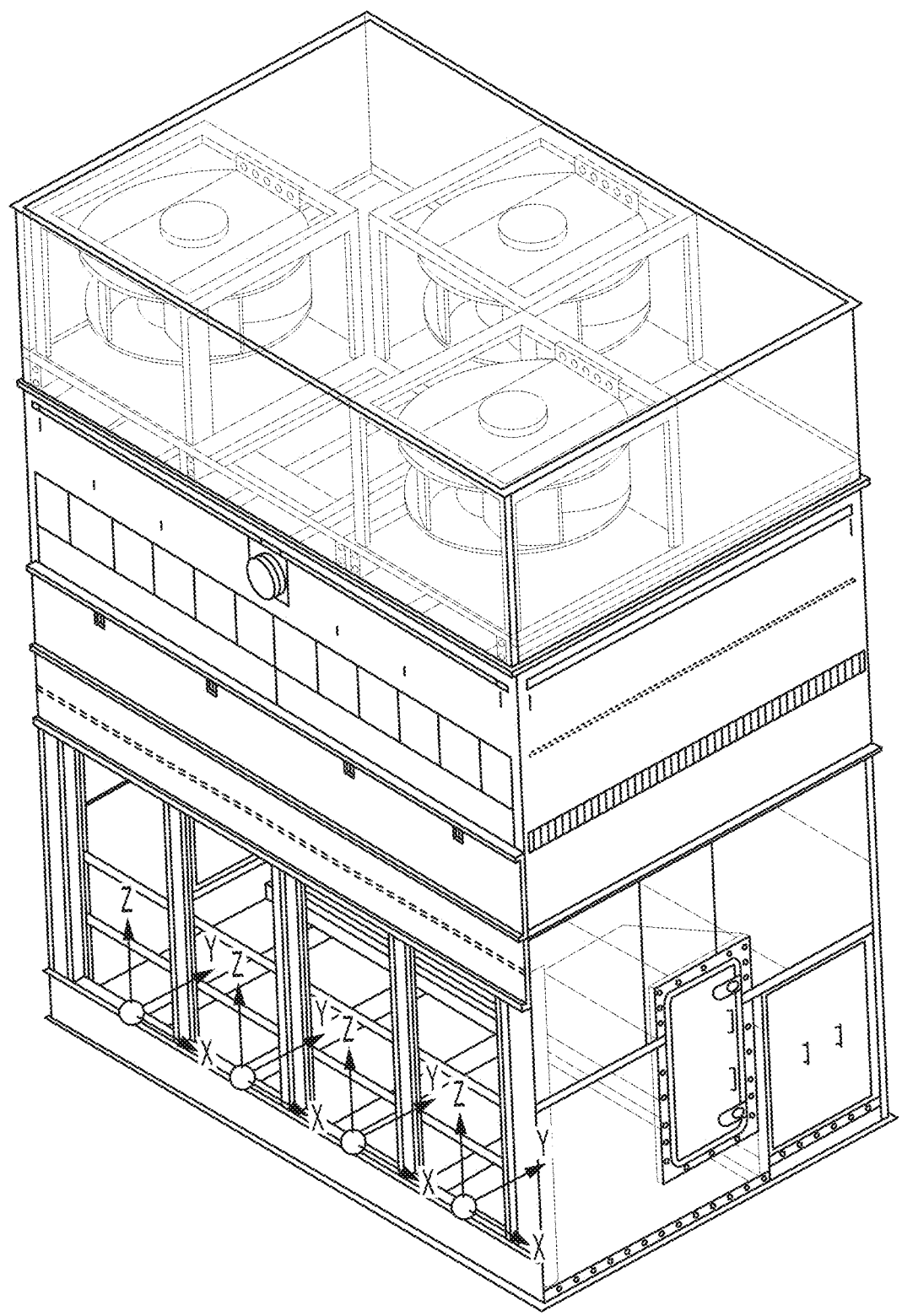
FIG. 10 is a three-dimensional representation of a cooling tower according to an embodiment of the invention with three side-mounted backward-curved centrifugal fans on top, arranged in a staggered arrangement with two fans on a single air intake side of an air intake plenum.
Figure 11:
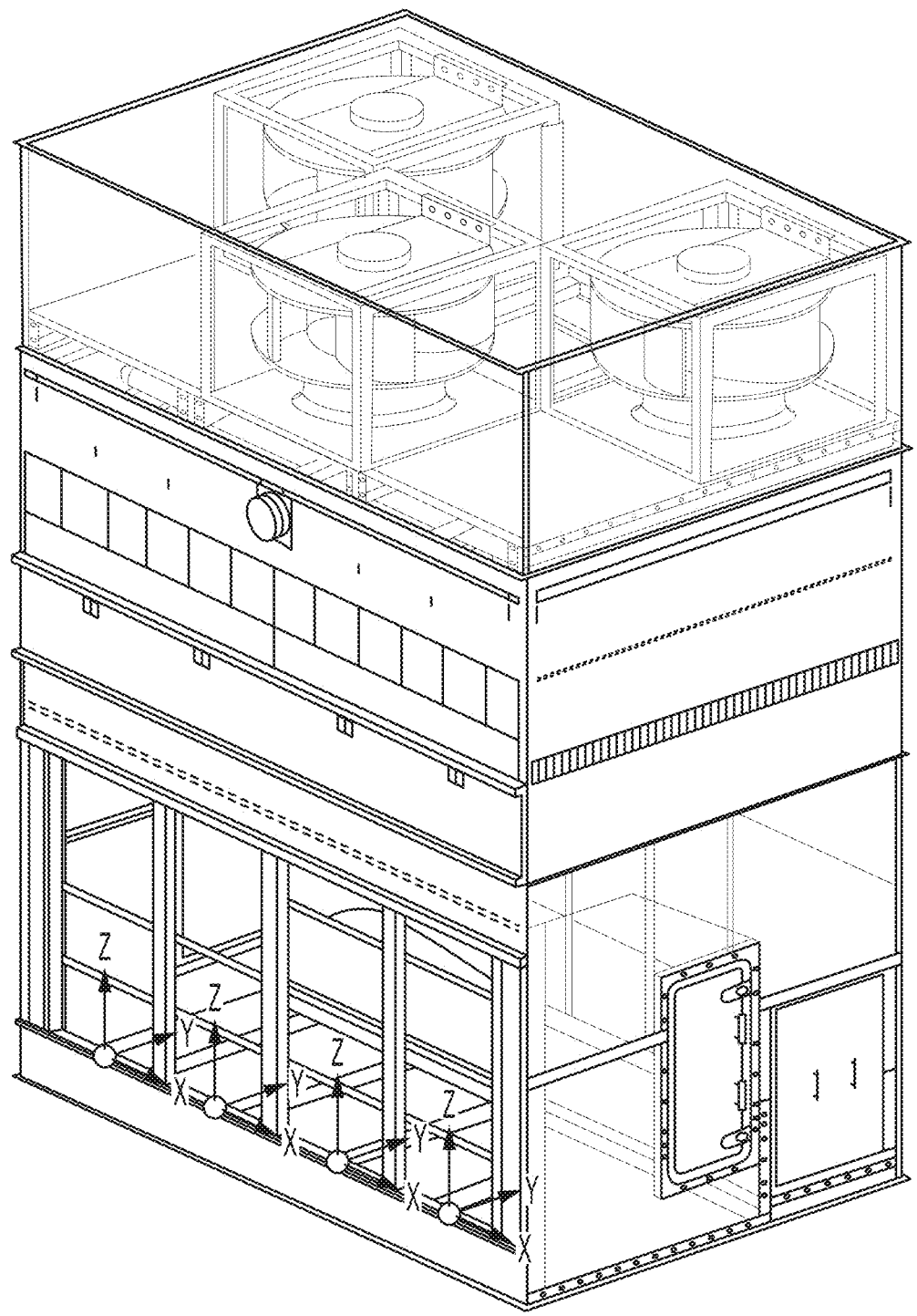
FIG. 11 is a three-dimensional representation of a cooling tower according to an embodiment of the invention with three side-mounted backward-curved centrifugal fans on top, arranged in a staggered arrangement with only one fan on a single air intake side of an air intake plenum.
Figure 12:
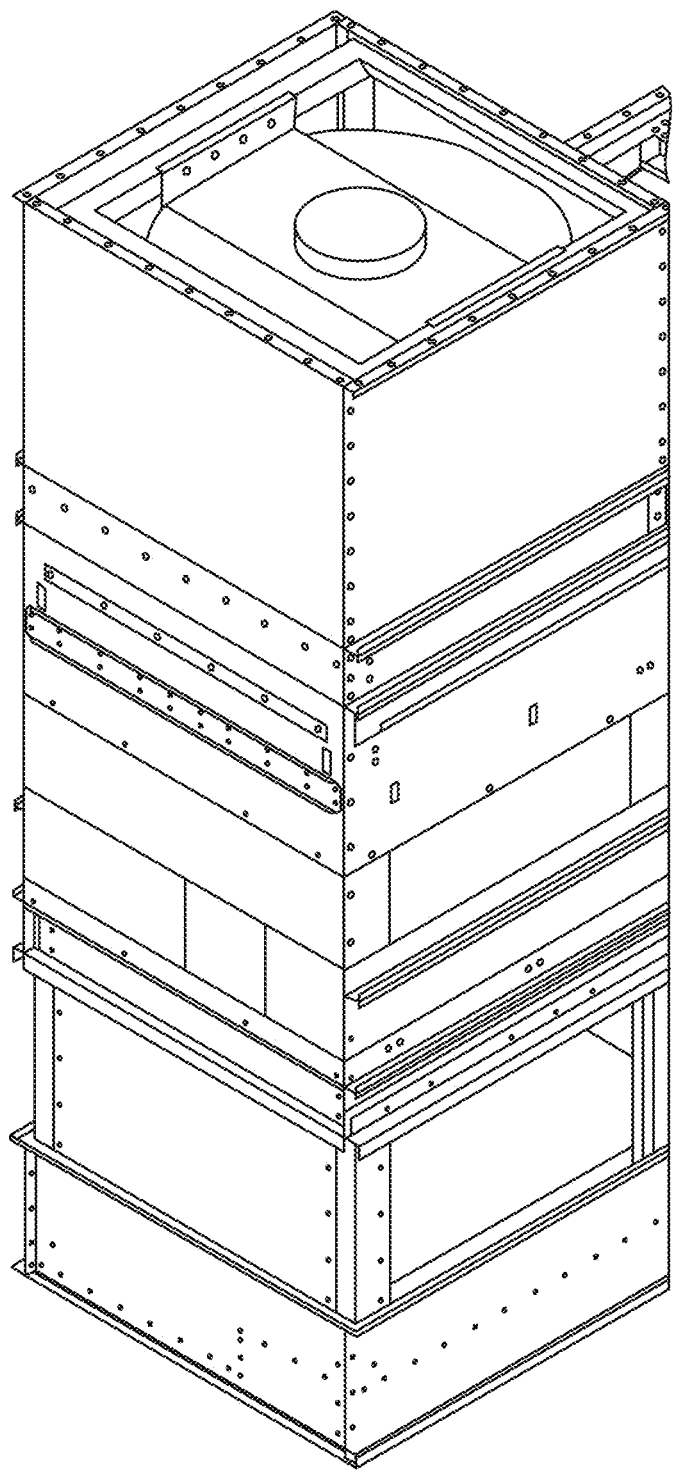
FIG. 12 is a three-dimensional representation of a cooling tower according to an embodiment of the invention with a single side-mounted backward-curved centrifugal fan on top.

As discussed above, one advantage of the invention is the ability to easily adjust heat rejection capability adding/subtracting fans without impacting unit footprint. In this regard, several fan arrangements are presented. According to some embodiments, two, three, four or more fans may be arranged in-line or in a staggered arrangement. In the case of a single air inlet face, the row of in-line fans may be arranged above a single air inlet face as shown in FIG. 8 or opposite a single air inlet face as shown in FIG. 9. According to other embodiments, three fans may be placed in a staggered arrangement with two fans above a single air inlet face as shown in FIG. 10, or with only one fan above a single air inlet face, as shown in FIG. 11. In other staggered arrangements with greater numbers of fans, half of the fans (or nearly half, in the case of an odd number of fans) may be arranged on one side of the unit and the remaining fans may be arranged on an opposite side of the unit. According to a two-fan embodiment, one fan may be situated on one side of the unit and the other fan on an opposite side of the unit. In larger format devices with a larger number of fans, the fans may arranged consistent with any of the embodiments discussed above, or they may be staggered across the entire air outlet of the fan plenum. The heat rejection device may also be configured as a single fan unit (FIG. 12).

Figure 13:
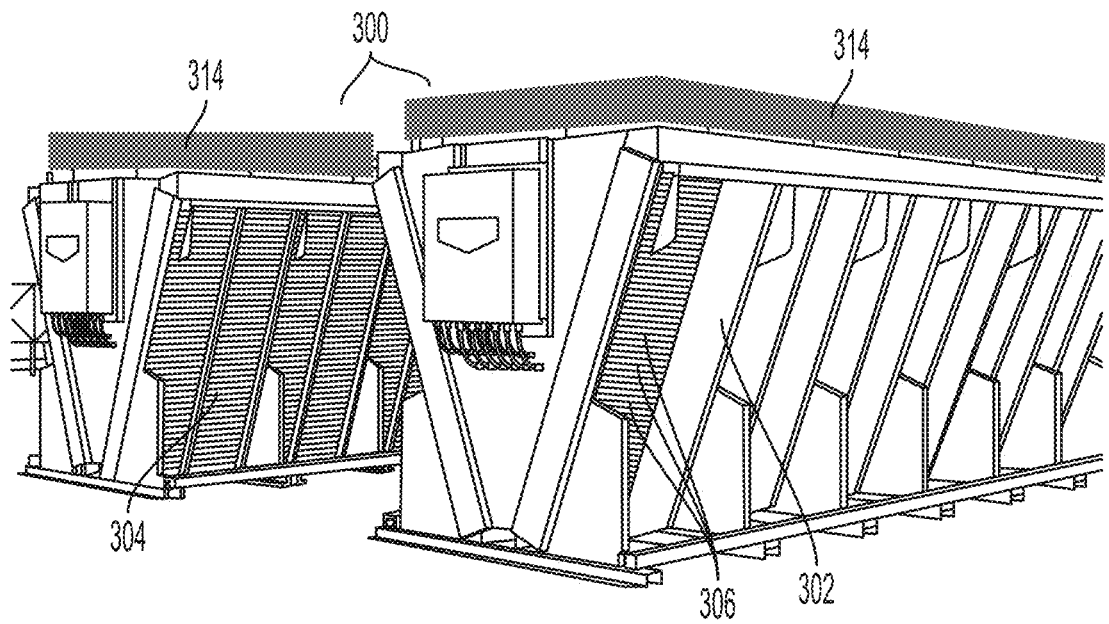
FIG. 13 is a three-dimensional representation of a dry cooler according to an embodiment of the invention with three side-mounted backward-curved centrifugal fans on top.
Figure 14:
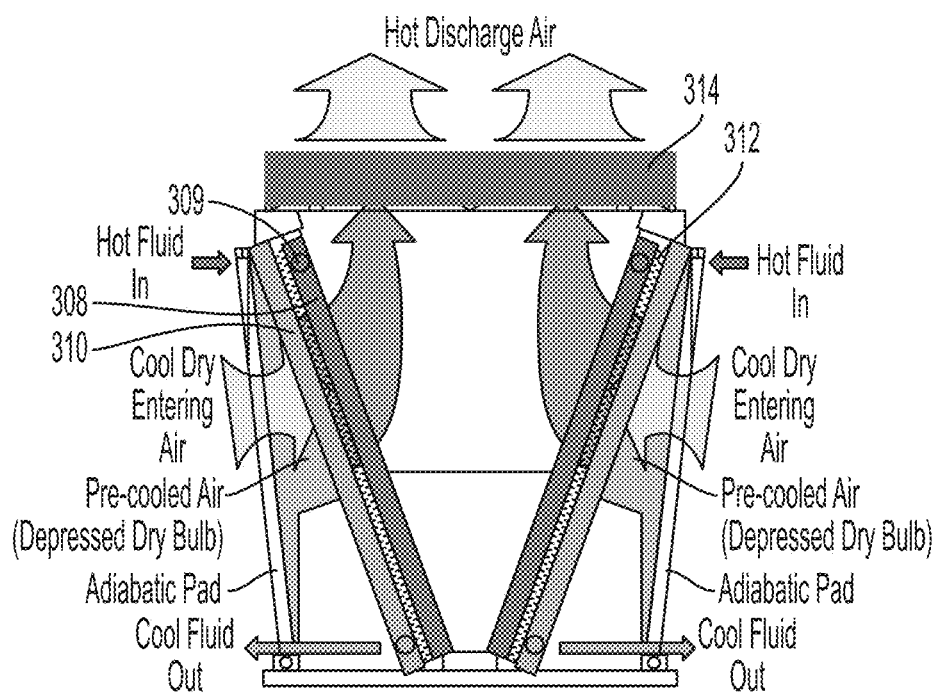
FIG. 14 a two dimensional cross-sectional representation of a dry cooler according to an embodiment of the invention with three side-mounted backward-curved centrifugal fans on top.

An example of a dry cooler/condenser 300 is shown in FIGS. 13 and 14. A frame 302 supports two coil bundles 304 each comprising a plurality of horizontally arranged finned tubes 306 in a V-shaped configuration. At one end of each tube bundle, the tubes are connected at an inlet end to an inlet header 308 and to an outlet header 310. At an opposite end of each bundle, each horizontal tube is connected to an adjacent horizontal tube via a return bend 312. A hot process fluid enters the inlet header 308 via an inlet header connection 309 and is then distributed to the tubes 306 from the inlet header. Cooled fluid exits the tubes 306 via an outlet header 310 and returned to the process/system that heated the fluid. The frame supports a plurality of side-mounted backward-curved centrifugal fans 314 at the top of the cooler 300 and draws ambient air into the unit past the tubes 306 and the fins and out the top of the unit.

Hot process fluid, shown in red, enters the inlet header 308 via the inlet header connection 309. From the inlet header 308, the hot process fluid travels transversely across the heat exchanger, generally parallel to the horizontal. Heat from the process fluid dissipates through the coil tubes surface and out to the fins (not shown). Ambient air is drawn over the coil surface by the fans located at the top of the unit. Heat from the process fluid transfers to the air and discharged to the atmosphere. Cool process fluid, shown in blue, exits the unit through the outlet headers.

Figure 15:
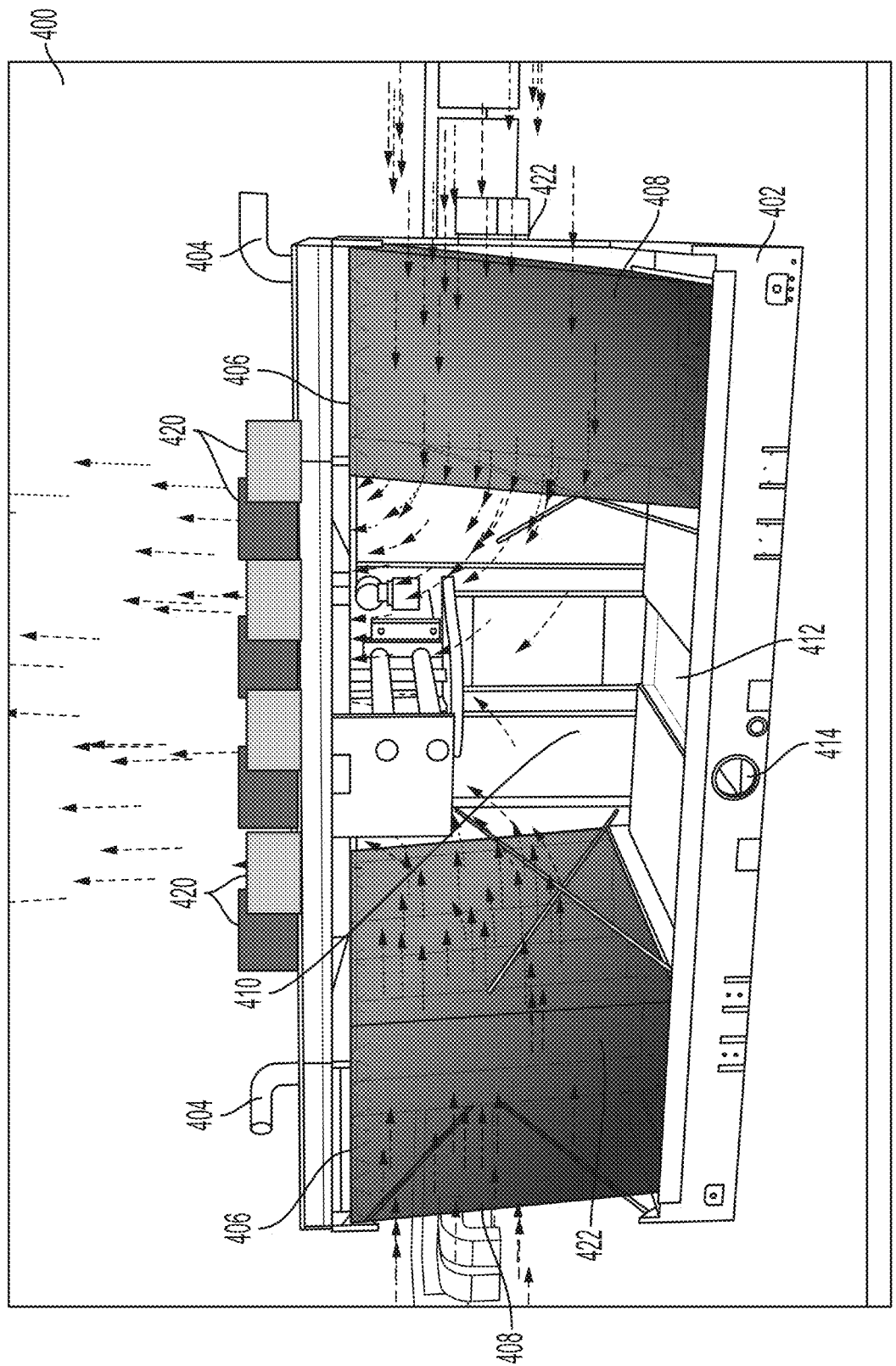
FIG. 15 is a three-dimensional cutaway representation of a cross-flow cooling tower with eight side-mounted backward-curved centrifugal fans on top.

In a cross-flow cooling tower embodiment, represented in FIG. 15, cross-flow cooling tower 400 includes four-sided metal housing 402. Hot water intakes 404 receive hot water from a process and deliver it to water distribution system 406 which may include a gravity feed basin with a plurality of holes or nozzles arranged in the basin floor to drop or spray the hot water downward over two sections of liquid dispersion media or "fill" 408 that flank a central plenum 410. A water basin 412 is located beneath both sections of fill and the central plenum where cooled water is collected and returned to a source via cool water outlet 414. Above the water distribution system there may be an optional fan plenum (not shown), and on the top of the unit, above the central plenum 410, multiple backward-curved centrifugal fans 420 are arranged on the top of the unit above the central plenum 410. The fans may be AC belt drive or EC direct drive motors. While eight backward-curved centrifugal fans are shown in FIG. 15, fewer larger backward-curved centrifugal fans or an even larger number of backward-curved centrifugal fans may be used.

In operation, hot water enters the water distribution system 406 via the hot water intakes 404 and is sprayed over the fill 408. Air enters the device through openings 422 in the housing on the sides of the fill sections opposite the central plenum 410. The air is drawn through the fill 408, into and up through the central plenum 410 and out through the backward-curved centrifugal fans 420. Contact between the falling hot water and the rising air cools the water which falls into the basin for recirculation back to the source.

The significant and unexpected advantages of replacing the axial fan in induced draft cooling towers, closed circuit coolers and condensers is explained above in the Summary of the Invention and need not be repeated here.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

The invention claimed is:

1. A heat rejection device comprising:
   a housing having four vertically oriented sides arranged in a rectangle, a bottom portion comprising a water basin, and a top portion comprising a fan section,
   said housing further defining an air intake plenum immediately above said water basin, a fan plenum immediately below said fan section;
   said heat rejection device further comprising a water distribution system below said fan plenum and a heat exchange section below said water distribution system, said water distribution system configured to spray water into said heat exchange section;
   wherein said fan section comprises at least one backward-curved centrifugal fan mounted on its side with an air intake side facing downward.

2. The heat rejection device of claim 1, comprising a cooling tower wherein said heat exchange section is a direct heat exchanger in which hot water distributed from said water distribution system is cooled by direct contact with air drawn through said heat rejection device by said at least one backward-curved centrifugal fan.

3. The heat rejection device of claim 1, comprising a closed circuit condenser or cooler wherein said heat exchange section comprises an indirect heat exchange coil configured to receive a hot process fluid.

4. The heat rejection device of claim 3, further comprising a dry indirect heat exchange section arranged in said housing below said fan plenum and above said water distribution system.

5. The heat rejection device according to claim 1, wherein said at least one backward-curved centrifugal fans comprises at least two backward-curved centrifugal fans.

6. The heat rejection device according to claim 5, wherein said at least two backward-curved centrifugal fans are arranged in-line on one side of said heat rejection device.

7. The heat rejection device according to claim 5, wherein said at least two backward-curved centrifugal fans are arranged on opposite sides of said heat rejection device.

8. The heat rejection device according to claim 1, wherein said at least one backward-curved centrifugal fan comprises at least three backward-curved centrifugal fans.

9. The heat rejection device according to claim 8, wherein said at least three backward-curved centrifugal fans are arranged in-line.

10. The heat rejection device according to claim 8, wherein said at least three backward-curved centrifugal fans are set in a staggered arrangement.

11. A dry heat rejection device comprising two heat exchange tube bundles arranged in a V-shaped frame, said heat exchange tube bundles each comprising a plurality of heat exchange tubes arranged horizontally; said heat exchange tubes connected at one end to a hot fluid inlet header and at another end to a cool fluid outlet header; said dry heat rejection device further comprising a plurality of backward-curved centrifugal fans mounted atop said heat rejection device with air intake side facing downward and configured to draw air through said heat exchange tube bundles into a space between said heat exchange tube bundles, through said air intake side of said backward-curved centrifugal fans and out of said dry heat rejection device.

12. A cross-flow heat rejection device comprising:
a housing having four vertically oriented sides arranged in a rectangle, a bottom portion comprising a water basin, and a top portion comprising a fan section,
said housing further defining a central plenum flanked by two heat exchange sections each comprising liquid dispersion media;
said heat rejection device further comprising a water distribution system below said fan section and above both said two heat exchange sections, said water distribution system configured to spray water into said liquid dispersion media in said two heat exchange sections;
wherein said fan section comprises at least one backward-curved centrifugal fan mounted on its side with an air intake side facing downward toward said central plenum.

* * * * *